US012017235B2

(12) United States Patent
Mangold et al.

(10) Patent No.: US 12,017,235 B2
(45) Date of Patent: Jun. 25, 2024

(54) ATOMISER SYSTEM HAVING A SILICONE NOZZLE ARRAY

(71) Applicant: J. WAGNER GmbH, Markdorf (DE)

(72) Inventors: Sebastian Mangold, Salem (DE); Manuel Fiesel, Überlingen (DE); Jan Barthelmes, Heiligenberg (DE); Leon Luck, Markdorf (DE); Björn Freisinger, Krauchenwies (DE)

(73) Assignee: J. Wagner GmbH, Markdorf (DE)

( * ) Notice: Subject to any disclaimer, the term of this patent is extended or adjusted under 35 U.S.C. 154(b) by 235 days.

(21) Appl. No.: 17/309,734

(22) PCT Filed: Dec. 19, 2019

(86) PCT No.: PCT/EP2019/086282
§ 371 (c)(1),
(2) Date: Jun. 16, 2021

(87) PCT Pub. No.: WO2020/127713
PCT Pub. Date: Jun. 25, 2020

(65) Prior Publication Data

US 2021/0379608 A1 Dec. 9, 2021

(30) Foreign Application Priority Data

Dec. 21, 2018 (DE) ......................... 102018133440.0

(51) Int. Cl.
*B05B 1/14* (2006.01)
*B05B 1/10* (2006.01)
(Continued)

(52) U.S. Cl.
CPC .................. *B05B 1/14* (2013.01); *B05B 1/10* (2013.01); *B05B 5/035* (2013.01); *B05B 5/1691* (2013.01)

(58) Field of Classification Search
CPC .. B05B 1/10; B05B 1/14; B05B 5/035; B05B 5/1691
(Continued)

(56) References Cited

U.S. PATENT DOCUMENTS 10,589,298 B2 3/2020 Wright
2002/0000516 A1 1/2002 Schultz et al.
(Continued)

FOREIGN PATENT DOCUMENTS

CN 1437760 A 8/2003
CN 106687218 A 5/2017
(Continued)

OTHER PUBLICATIONS

International Preliminary Report for International Patent Application No. PCT/EP2019/086282, dated Jun. 16, 2021, date of filing: Dec. 19, 2019, 8 pages.
(Continued)

*Primary Examiner* — Steven J Ganey
(74) *Attorney, Agent, or Firm* — Christopher J. Volkmann; Kelly, Holt & Christenson, PLLC.

(57) ABSTRACT

An atomizer nozzle system, in particular for an electrohydrodynamic atomizer (1), wherein a nozzle cap (40) comprises a plurality of nozzles (10, 11, 12) and, in order to form a nozzle (10, 11, 12) comprises at least one nozzle opening (21, 22, 23), at least one nozzle channel and at least one nozzle socket, wherein the nozzle cap is arranged on at least one carrier and wherein the carrier comprises a nozzle connector for each nozzle socket, wherein the nozzle cap is arranged on the carrier in a releasably fastened manner.

20 Claims, 3 Drawing Sheets

Figure 1:
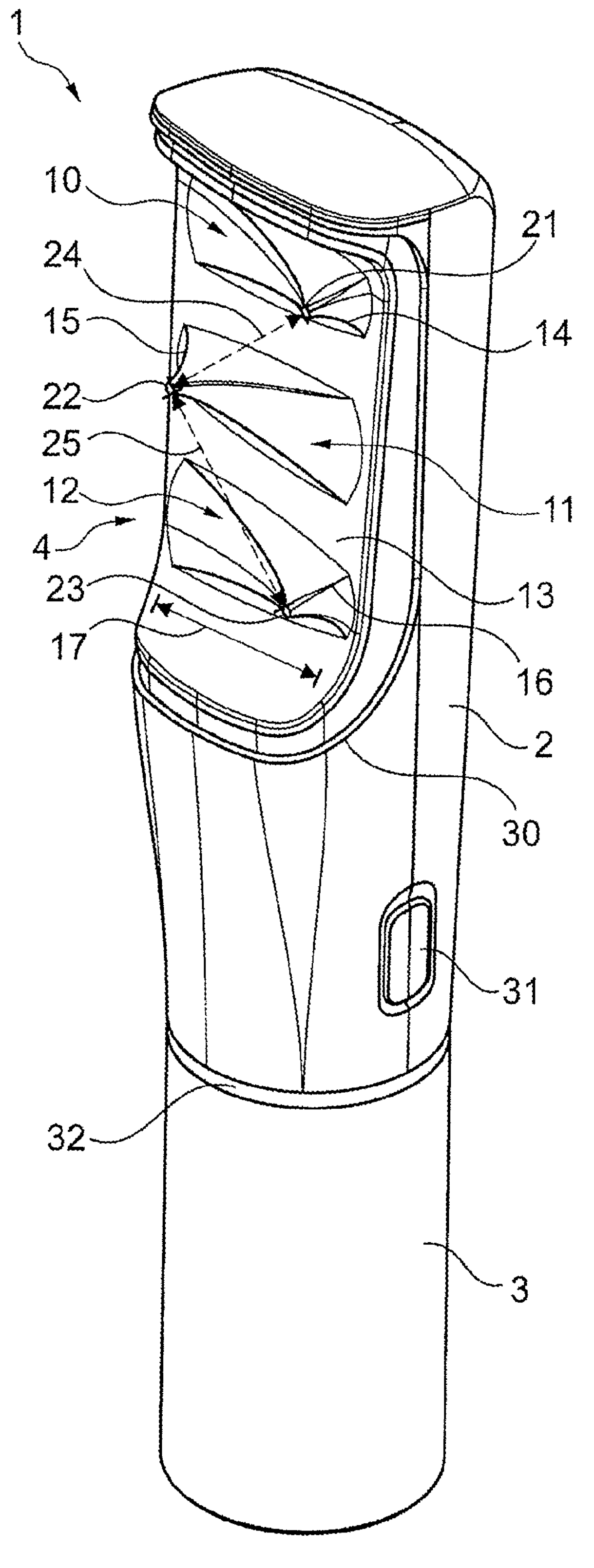

(51) Int. Cl.
*B05B 5/035* (2006.01)
*B05B 5/16* (2006.01)

(58) Field of Classification Search
USPC ....... 239/690, 690.1, 602, 533.13, 548, 552, 239/332, 337
See application file for complete search history.

(56) References Cited

U.S. PATENT DOCUMENTS

| | | | |
|---|---|---|---|
| 2004/0021017 A1 | 2/2004 | Sumiyoshi et al. | |
| 2014/0110493 A1* | 4/2014 | Cooper | B05B 5/087 239/690.1 |
| 2018/0361405 A1 | 12/2018 | Hartman | |

FOREIGN PATENT DOCUMENTS

| | | | |
|---|---|---|---|
| CN | 108554662 | A | 9/2018 |
| DE | 19830801 | A1 | 1/2000 |
| DE | 102014200741 | A1 | 7/2015 |
| DE | 102018109452 | A1 | 10/2018 |
| JP | 2014236926 | A | 12/2014 |
| JP | 2018183442 | A | 11/2018 |
| KR | 1020151006611 | A | 10/2015 |
| WO | WO0150499 | A1 | 7/2001 |
| WO | WO 2018032560 | A1 | 2/2018 |
| WO | WO 2018193065 | A1 | 10/2018 |

OTHER PUBLICATIONS

International Search Report and Written Opinion for International Patent Application No. PCT/EP2019/086282, dated Apr. 3, 2020, filing date of Dec. 19, 2019, 19 pages with English Translation.

First Office Action for Chinese Patent Application No. 201980092208.1 dated Jun. 22, 2022, with English Translation, 15 pages.

Second Japanese Office Action for Japanese Patent Application No. 2021-536235 dated Aug. 29, 2023, 4 pages.

European Search Report for European Patent Application No. 23196735.7 dated Dec. 21, 2023, 21 pages.

* cited by examiner

ATOMISER SYSTEM HAVING A SILICONE NOZZLE ARRAY

CROSS-REFERENCES TO RELATED APPLICATIONS

This Application is a Section 371 National Stage Application of International Application No. PCT/EP2019/086282, filed Dec. 19, 2019 and published as WO/2020/127713 A1 on Jun. 25, 2020, and claims priority to German Application No. 102018133440.0, filed Dec. 21, 2018, the contents of both are hereby incorporated by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR A JOINT INVENTOR

Not Applicable

BACKGROUND OF THE INVENTION

The electrohydrodynamic atomization of fluids is becoming increasingly significant in the field of coating methods. For example, PCT/EP2018/060117 discloses a device which uses electrohydrodynamic atomization to apply e.g. care products such as for example sun block to a person's body.

However, a large number of atomizer nozzles have not proven advantageous for applying electrohydrodynamic atomization. Moreover, there is often a problem with the necessary cleaning of the systems, since simple cleaning with water is not readily possible given the high voltage which is necessary for electrohydrodynamic atomization.

BRIEF SUMMARY OF THE INVENTION

An atomizer nozzle system, in particular for an electrohydrodynamic atomizer, includes a nozzle cap that includes a plurality of nozzles. The plurality of nozzles comprise at least one nozzle opening, at least one nozzle channel and at least one nozzle socket. The nozzle cap is arranged on at least one carrier. The carrier includes a nozzle connector for each nozzle socket. The nozzle cap is arranged on the carrier in a releasably fastened manner.

BRIEF DESCRIPTION OF THE SEVERAL VIEWS OF THE DRAWING(S)

FIG. 1. shows a schematic illustration of an electrohydrodynamic atomizer.

Figure 2:
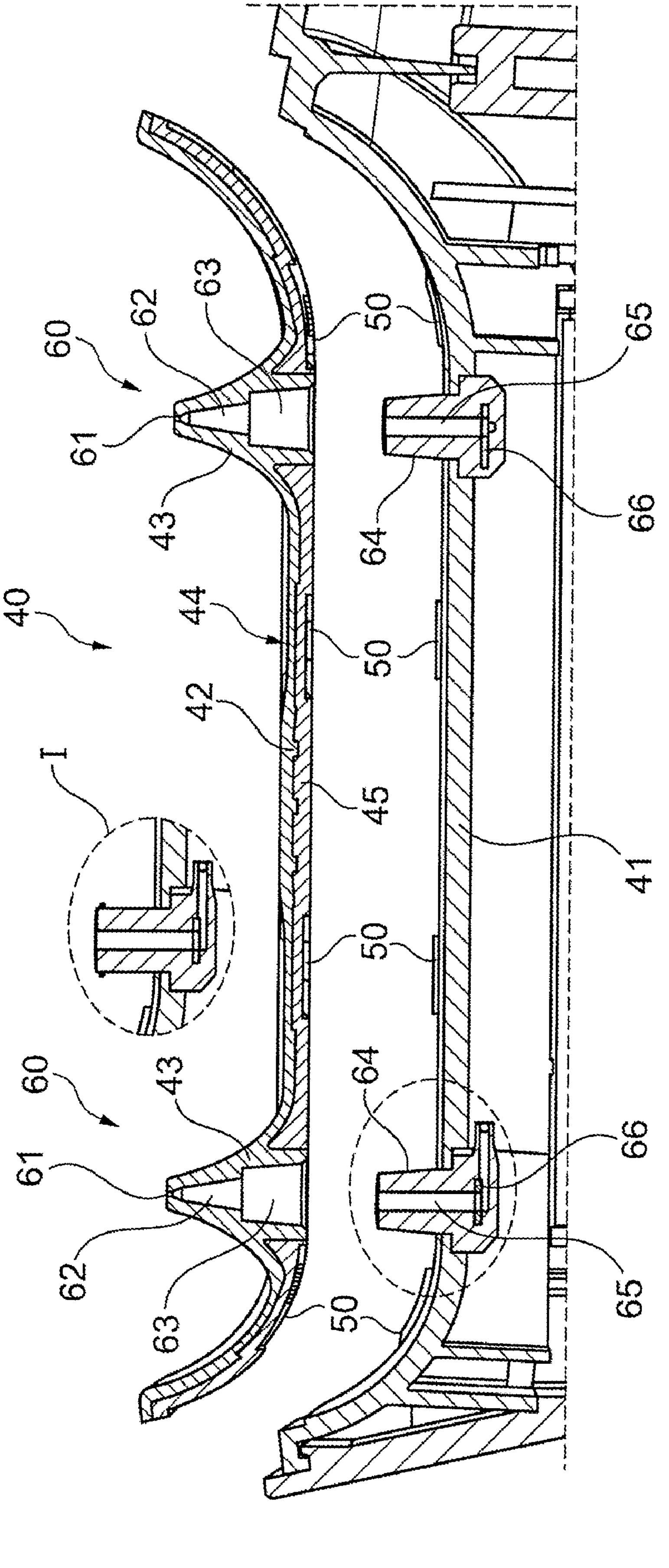

FIG. 2 shows a schematic cross section through a first embodiment of an atomizer nozzle system with a nozzle cap and carrier as well as a variant of the nozzle connector in an illustration of a detail.

Figure 3A:
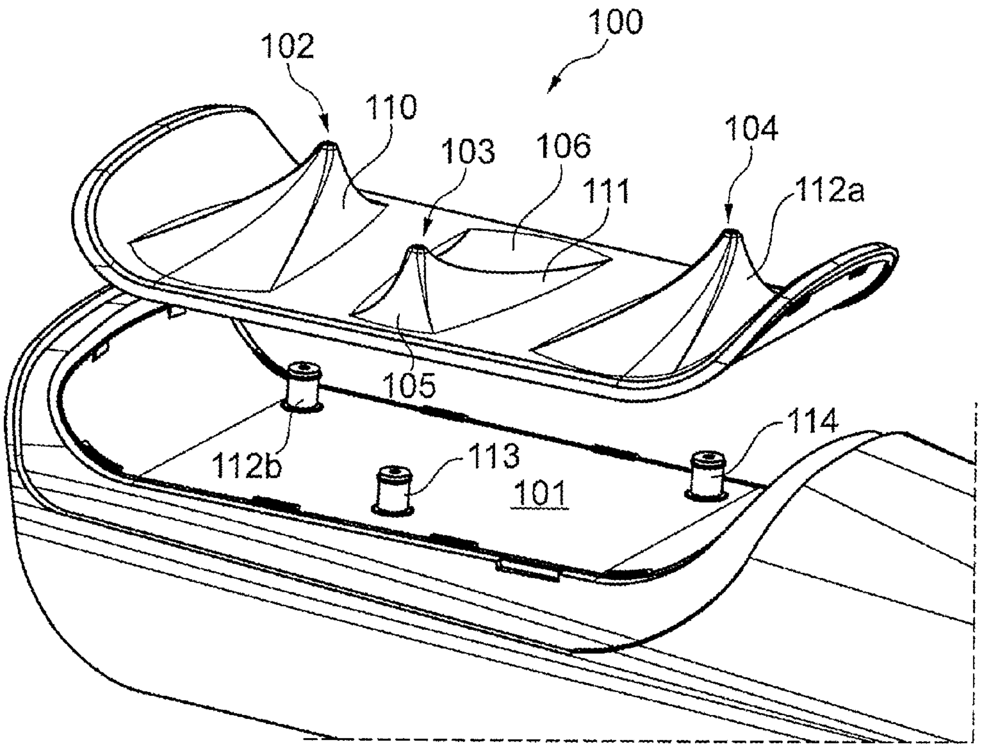

FIG. 3*a* shows a perspective schematic illustration of a second embodiment of an atomizer nozzle system with a nozzle cap and carrier.

Figure 3B:
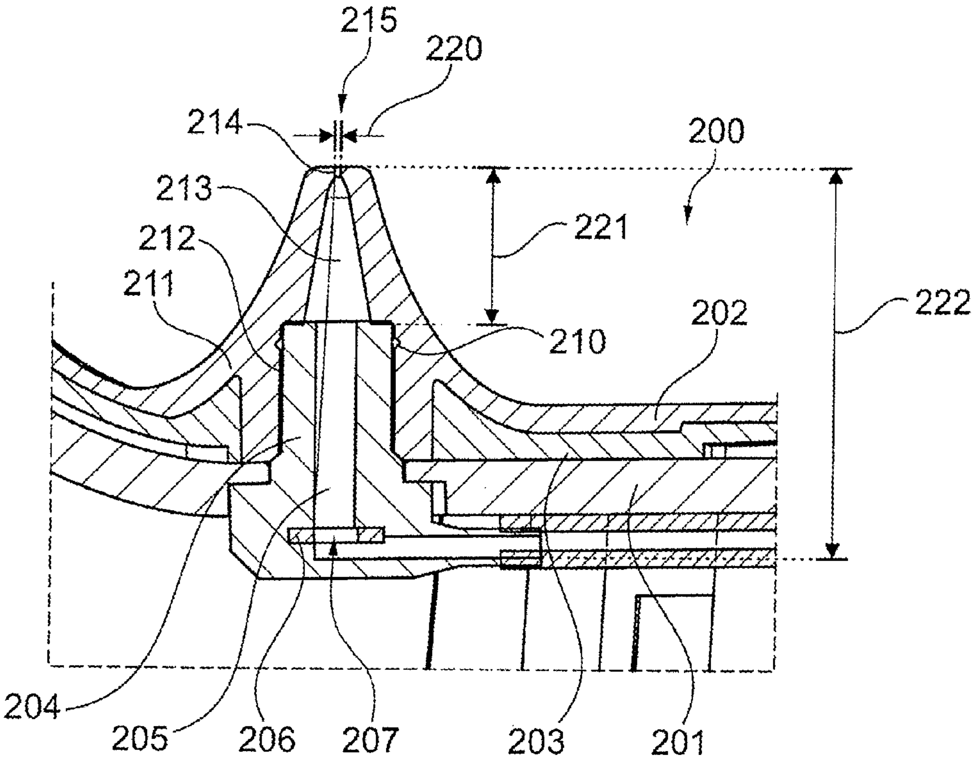

FIG. 3*b* shows an enlarged section through an atomizer nozzle of an atomizer nozzle system.

DETAILED DESCRIPTION OF THE INVENTION

An object of an example of the invention is therefore to improve the function of an electrohydrodynamic atomizer and to simplify, in particular, the cleaning.

This object is achieved by the subject matter of an example of the invention as claimed in patent claim 1. Advantageous developments and expedient refinements are disclosed in the dependent claims.

An example of the invention relates to an atomizer nozzle system, in particular for an electrohydrodynamic atomizer, wherein a nozzle cap comprises a plurality of nozzles and, in order to form a nozzle comprises at least one nozzle opening, at least one nozzle channel and at least one nozzle socket, wherein the nozzle cap is arranged on at least one carrier and wherein the carrier comprises a nozzle connector for each nozzle socket. An example of the invention is characterized in that the nozzle cap is arranged on the carrier in a releasably fastened manner.

As a result of the releasable fastening of the nozzle cap to the carrier, the nozzle cap can be taken off and removed from the device unit of the electrohydrodynamic atomizer, e.g. cleaned with water or other solvents. This also makes it conceivable for replacement to be carried out by the user in a simplified way after wear has occurred. Moreover, alternative nozzle caps can also be used, the geometries and other properties of which are adapted to other fluids which are to be atomized.

One preferred embodiment provides that the nozzle cap is manufactured at least partially from a flexible material, in particular from a flexible electrical insulator, preferably a silicone.

The use of a flexible material, e.g. of a silicone, makes it possible to remove dried-in fluid residues through simple deformation of the surface, e.g. by stroking a finger over it, since the hardened residues crumble owing to the deformation and can therefore be removed.

The use of an insulator has also surprisingly proven advantageous for electrohydrodynamic atomization. The atomization effect which is experienced by the fluid which is charged with a high voltage is improved by the guidance in an electrically insulating nozzle channel, which leads to higher process reliability during the electrohydrodynamic application of the atomizer, for example when applying care products such as sun cream.

A further preferred embodiment provides that the carrier is manufactured from a rigid material, preferably from plastic, e.g. PC, ABS, PE, PET or PP or the like.

A rigid carrier permits precise and operationally reliable fastening of the flexible nozzle cap, for example by means of rigid elements for orienting and fastening.

Such rigid elements can be formed by projections or structures, e.g. collars or mushroom heads, but also by tongue and groove elements into which corresponding mating structures of the nozzle cap then engage, in particular latch in elastically.

One advantageous development of an embodiment provides that the nozzle cap is secured on the carrier by elastically tensioning latching elements or tensioning a flexible material, and is preferably held in a positively locking fashion.

The use of a flexible, rubber-like nozzle cap, preferably composed of silicone, makes it possible to clamp it elastically onto the carrier and therefore release it without tools. In the case of an inflexible or partially flexible nozzle cap it is then possible to implement a simple connection which can be released without tools, e.g. by means of latching elements.

A further preferred embodiment provides that the nozzle cap comprises a base structure, in particular a base plate or a base frame on which a nozzle structure is arranged in order to form the atomizer nozzles, wherein the base structure is manufactured from a more rigid material in comparison with the nozzle structure which is preferably manufactured from silicone, said base structure being manufactured in particular from PC, ABS, PE, PET or PP or the like, and preferably comprising at least one connecting element, in particular a latching element, for forming a preferably releasable connection with the carrier.

A flexible, pliable layer of a nozzle geometry, formed on a rigid base structure, permits a nozzle geometry to be made available e.g. from silicone without having to dispense with mechanical latching elements for releasably connecting to a carrier. Moreover, in this way the haptics are improved when dismantling and mounting the nozzle cap, since a certain degree of dimensional stability is achieved. The base structure can be embodied here as a type of plate which contains breakthroughs for the nozzle connectors and/or nozzle sockets, or as a frame structure which supports and stabilizes only at the necessary points.

A development which is improved further provides that the nozzle cap comprises at least three nozzle openings, each with an assigned nozzle channel and each with an assigned nozzle socket, wherein the nozzle openings are spaced apart from one another to a maximum degree in a nozzle area, in particular are arranged following one another along a zig zag line.

It has become apparent that an arrangement of at least three nozzle openings provides atomization behavior which has process reliability. A relatively high number of nozzle openings is also conceivable, wherein the number of nozzle openings preferably varies within the single-digit range.

However, it is relevant that the nozzle openings are spaced apart to a maximum extent, that is to say maintain the largest possible distance, in the region of the nozzle cap which is available for the arrangement. In this example a zig zag arrangement is to be aimed at on a surface, since this maximizes the distance between the nozzle openings. During the dimensioning of the distance of the nozzle openings, the geometries of the nozzles must also be considered themselves, since an opening can never be located directly at the edge of a region but rather is generally surrounded by a nozzle body which accommodates the nozzle channel.

One advantageous development is furthermore characterized in that the nozzle opening of the nozzle projects out of the plane of the nozzle cap, wherein an edge of the nozzle which projects out is embodied preferably as a continuously curved curve, and in particular the edge of the nozzle is asymmetrical on an edge side with respect to an opposite edge side of the nozzle, in particular has greater curvature by at least a factor of 1.5.

The nozzle opening, which is provided through a nozzle body, projects out of the plane of the nozzle cap in order to define a nozzle geometry, in particular to accommodate a nozzle channel in the interior of the nozzle body. The plane of the nozzle cap is to be understood as the essentially flat underlying surface on which the nozzle geometry is arranged. The raised edge regions which are illustrated in the later exemplary embodiment remain on the outside here.

Here the edges or side walls of the nozzle body extend as a continuously curved shape. Owing to the arrangement at the largest possible distance, a smaller installation space is available on the edge side of the nozzle body lying close to the edge of the nozzle cap than on the opposite side. In this respect, the curvature on the side remote from the edge can end in a flatter fashion, which is clarified in the later exemplary embodiment. As a result, there are softer transitions achieved, which is advantageous for cleaning.

A further expedient embodiment provides that the nozzle cap and/or a base plate and/or the carrier plate are embodied in one piece, preferably manufactured using an injection molding method.

A corresponding manufacturing method permits cost-effective and efficient fabrication of the component or of the components.

A further expedient embodiment also provides that the nozzle cap and a base plate and/or the carrier plate are/is embodied in one piece, preferably manufactured using a multi-component injection molding method or are connected to one another in some other way, e.g. by bonding or vulcanization processes.

A corresponding manufacturing process permits cost-effective and efficient fabrication of the component or components. Moreover, inadvertent separation of the components of the nozzle cap is avoided by the two last-mentioned manufacturing methods, which provides a higher level of fail safety to the user.

There is also provision that in one embodiment the nozzle cap engages, with an elastic section on the nozzle connector, around a connecting flange and forms a seal on the latter by means of elastic deformation.

Owing to its releasability, the nozzle cap must form a seal-forming connection on the nozzle connector of the carrier. This is preferably achieved in that an elastic section, preferably made of silicone, engages around the connecting flange of the nozzle connector in a seal-forming fashion, wherein the tensioning force of the elastic section must withstand the prevailing delivery pressure of the fluid to be atomized, during the operation of the electrohydrodynamic atomizer.

An embodiment which is preferred in this respect provides that the nozzle connector has a cylindrical connecting flange, in particular with a peripheral sealing ring, and the nozzle socket forms a corresponding cylindrical receptacle, in order to provide an interlocking, seal-forming form fit.

The sealing ring can also be embodied as a bead which is directly formed from the connecting flange, in particular a bead structure which is directly manufactured during the injection molding, in order to avoid additional components or working steps.

A corresponding cylindrical connecting flange can be easily fabricated with process reliability during the manufacturing method and provides the user with simple connection of the fluid system with reliable sealing effect during the mounting and dismantling of the releasably connecting nozzle cap.

The sealing bead which is formed, and which is securely connected to the connecting flange, can be used to cause the flexible soft material, in particular silicone of the nozzle cap, to bring about sufficient clamping force with the sealing bead on the connecting flange along with the seal in such a way that the nozzle cap on the carrier is secured to the sealing bead by clamping.

An alternative preferred embodiment provides that the nozzle connector has a conical connecting flange, and the nozzle socket forms a corresponding conical receptacle, in order to provide an interlocking, seal-forming form fit.

The conical connecting flange also permits a preferred centering effect during assembly, wherein the conical edges of the connecting flange and nozzle socket which bear one against the other form a seal-forming contact.

One further preferred embodiment provides that the nozzle channel is embodied shaped as a conical section or as a conical cap and forms, in particular an end channel toward the nozzle opening, wherein the end channel is preferably embodied as a cylindrical or conical tubular section.

One such embodiment of the nozzle channel is the subject matter of the application DE 10 2018 133 406.0, to the disclosure of which reference is hereby made. A corresponding configuration of the nozzle channel forms an advantageous embodiment of an open jet of the fluid which is to be atomized, before the effect of the electrohydrodynamic atomization starts owing to the applied high voltage.

There is particularly preferably provision here that the nozzle opening of an atomizer nozzle is between 0.1 mm to 0.3 mm, is preferably 0.2 mm, and the length of the nozzle channel is between 4 mm to 6 mm, and is preferably 5.5 mm.

An expedient embodiment of the atomizer nozzle system provides that an electrical contact element, in particular a high-voltage contact, is formed in the nozzle connector, wherein the contact projects into a fluid channel, the fluid channel is preferably guided through the contact, and in particular the distance between the electrical contact element and the nozzle opening is between 5 mm and 20 mm, and is preferably between 11 mm and 15 mm, and is in particular 14 mm.

In order to implement electrohydrodynamic atomization it is necessary for the fluid which is to be atomized to be subjected to a high voltage. This high voltage is particularly advantageously applied in the region of the carrier, since otherwise, contact-forming means would have to be provided in turn in the nozzle cap.

It is particularly advantageous to form a contact for the high voltage as an electrical contact element which projects into the fluid channel. The fluid channel comprises here a channel through the nozzle socket. The electrical contact element is particularly preferably embodied in such a way that it is arranged in the course of the flow of the fluid, in particular the fluid flows through it through an opening in the electrical contact element. In this way, an optimum effect of the high voltage and associated charging of the fluid are ensured, bringing about a spray operation with process reliability.

The electrohydrodynamic atomization is based on the instability of electrically chargeable fluids, in particular fluids which are sufficiently electrically conductive under high voltage, in a highly non-homogeneous electrical field. The fluid is subjected here to a high voltage. The fluid is shaped into a cone, from the tip of which a thin jet is emitted, which subsequently directly decomposes into a spray of finely dispersed droplets. Under certain conditions, in a Taylor cone mode, the droplets have a narrow size distribution.

An atomization effect can also be improved as a result of the interaction with forced hydraulic provision of a flow of fluid, e.g. a pump.

Examples of the invention will be explained in more detail on the basis of the exemplary embodiments illustrated below. However, the invention is not limited to the embodiments illustrated.

In particular, FIG. 1 shows an electrohydrodynamic atomizer 1 which comprises an atomizer part 2 and a fluid tank 3.

A nozzle system 4 is arranged on the atomizer part 2, in the upper front region. The nozzle system comprises here a first nozzle 10, a second nozzle 11 and a third nozzle 12.

The nozzles 10, 11, 12 are embodied here as nozzle bodies 14, 15, 16 which project out of a plane 13 of the nozzle system 14, wherein the nozzle bodies are shaped asymmetrically with curved lateral edges in their transverse direction 17 in order to extend the nozzle system 4.

Each of the nozzles 10, 11, 12 has a nozzle opening 21, 22, 23 at its tip. The nozzle openings 21 and 22 are spaced apart from one another by a distance 24 which is as large as possible. The nozzles 22 and 23 are spaced apart from one another by a distance 25 which is as large as possible. The arrangement of the nozzles 21, 22, 23 follows a zig zag pattern in its spacing, so that the best possible spacing is formed in the plane 13 of the nozzle system 4.

The atomizer part 2 has in the surroundings of the nozzle system 4, a receptacle 30 for a lid (not illustrated) which covers and protects the nozzle system 4 in the transportation state.

Furthermore, the atomizer part 2 has at least one operator control pushbutton key 31 which can be used to activate the electrohydrodynamic atomizer 1 and to form contact with the user in order to provide the necessary flow of current during the atomization. A further two contacts, in particular operator control pushbutton keys, are preferably provided (not illustrated here since they are arranged on the rear side), so that the electrohydrodynamic atomizer 1 can be operated without difficulty either with the left or the right hand.

Furthermore, on the atomizer part 2, an electrically conductive, preferably metallic or metallized contact region which runs all around, here a contact ring 32, is provided in the region between the atomizer part 2 and the fluid tank 3, in order to serve for the user as a contact-forming means for providing the necessary flow of current during the atomization. Other arrangements are also considerable on the device, insofar as they entail good formation of contact with process reliability.

FIG. 2 shows a schematic cross section through a first embodiment of an atomizer nozzle system with a nozzle cap and carrier as well as a variant of the nozzle connector as an illustration of a detail.

A nozzle cap 40 is illustrated lifted out from a carrier 41 here. The nozzle cap 40 comprises here a nozzle structure 42 which is manufactured from silicone here. The nozzle structure 42 forms the nozzle bodies 43 which project out of the plane 44 of the nozzle cap.

Underneath the nozzle structure 42, the nozzle cap 40 comprises here a base plate 45 which is manufactured from a material which is more rigid than the silicone of the nozzle structure 42, in particular a relatively rigid plastic. In this way, the nozzle cap 40 is provided as a rigid assembly which can be fastened well on the carrier 41 and released again.

In order to releasably fasten the nozzle cap 40 on the carrier 41, latching elements 50 are formed which secure in a clamping fashion a nozzle cap 40 which is positioned on the carrier 41.

The atomizer nozzle 60 of the nozzle cap 40 comprises a nozzle opening 61 and a nozzle channel 62 which opens into a nozzle socket 63. The mating piece for the nozzle socket 63 is formed by the nozzle connector 64 on the carrier 41. In the embodiment which is illustrated here, the nozzle connector 64 and the nozzle socket 63 are conically shaped so that when the nozzle cap 40 is fitted onto the carrier 41 the two conical edges bear one against the other and therefore form a seal.

In the nozzle connector 64 a fluid channel 65 is provided, at the lower end of which an electrical contact 66 for introducing the high voltage into a fluid is arranged. The electrical contact is provided here with a drilled hole in the region of the fluid channel 65, so that the fluid flows through the electrical contact 66 while said fluid is being transported to the nozzle opening 61.

In the cut-out illustration I, an alternative variant of a nozzle connector is illustrated which uses a cylindrical shape with an arranged sealing element instead of a conical shape. This variant is described in more detail below in FIG. 3B, but can be used at the designated point on the carrier 41 as described below.

FIG. 3*a* shows a perspective schematic illustration of a second embodiment of an atomizer nozzle system with a nozzle cap 100 and carrier 101.

Three atomizer nozzles 102, 103, 104 are arranged on the nozzle cap 100. The atomizer nozzles have curved edges on their nozzle body. By way of example reference is made to the nozzle 103. The edge 105 which is illustrated on the front here has a continuously curved profile, wherein in comparison with the edge 106 illustrated on the rear the curvature is considerably more pronounced. The ramp-like structure of the edges of the nozzle bodies 110, 111, 112*a* permits a surface which is easy to clean and has raised nozzle bodies to be provided, with which surface spaced apart of the nozzles 102, 103, 104 are at a distance which is as large as possible.

The carrier 101 arranged under the nozzle cap 100 comprises a connecting flange 112*b*, 113, 114 for each atomizer nozzle 102, 103, 104. The connecting flange is cylindrical here and comprises a sealing ring on its upper edge, which is designed as an integrally formed sealing bead here.

FIG. 3*b* shows a correspondingly enlarged illustration of a nozzle cap 200 which is fitted onto a carrier 201.

The nozzle cap 200 comprises here again a nozzle structure 202 which is composed of silicone and which is arranged on a base structure 203 which is composed of a relatively rigid plastic.

The connecting flange 204 of the carrier 201 is of cylindrical design here. A fluid channel 205 runs in the center of the connecting flange 204. An electrical contact element 206 is arranged at the lower end of the fluid channel 205, which contact element 206 has a central drilled hole 206 through which the fluid which is to be charged for the electrohydrodynamic atomization flows and in the process is charged with an applied high voltage.

At the upper end of the connecting flange 204 a sealing ring 210 is provided. The nozzle body 211 is equipped here with a cylindrical nozzle socket 212, into which the connecting flange 204 dips, and forms with its sealing ring 210 a seal with respect to the flexible material of the silicone of the nozzle body 211. Above the connecting flange 204 there is, in the nozzle body 211, the nozzle channel 213 which opens at its upper end into an end channel 214. The nozzle opening 215 is in turn formed by the upper end of the end channel 214. The nozzle channel 213 is embodied here in the shape of a cone, in particular in the form of a conical cap section.

One preferred dimension of an embodiment is given here with a diameter 220 of the nozzle opening 215 of 0.2 mm. The nozzle 213 is preferably embodied with a length 221 of approximately 5.5 mm. The entire length 222 of the fluid channel 205, together with the nozzle channel 213 in the interior of the nozzle, is preferably up to approximately 14 mm, wherein as a result an open jet of the atomized fluid (not illustrated) is generated ahead of the nozzle opening with an open jet length of 10 mm to 15 mm, before the atomization effect starts.

Although the present invention has been described with reference to preferred embodiments, workers skilled in the art will recognize that changes may be made in form and detail without departing from the spirit and scope of the invention.

LIST OF REFERENCES

I. Nozzle connector variant
1 Atomizer
2 Atomizer part
3 Fluid tank
3*a* Embodiment variant of atomizer nozzle system
3B Embodiment variant
3*b* Enlarged illustration
4 Nozzle system
10 Nozzle
11 Nozzle
12 Nozzle
13 Plane
14 Nozzle body
15 Nozzle body
16 Nozzle body
17 Transverse direction
21 Nozzle opening
22 Nozzle opening
23 Nozzle opening
24 Distance
25 Distance
30 Receptacle
31 Operator control pushbutton key
32 Contact ring
40 Nozzle cap
41 Carrier
42 Nozzle structure
43 Nozzle body
44 Plane of nozzle cap
45 Base plate
50 Latching elements
60 Atomizer nozzle
61 Nozzle opening
62 Nozzle channel
63 Nozzle socket
64 Nozzle connector
65 Fluid channel
66 Electrical contact
100 Nozzle cap
101 Carrier
102 Atomizer nozzle
103 Atomizer nozzle
104 Atomizer nozzle
110 Nozzle body edge
111 Nozzle body edge
112*a* Nozzle body edge
112*b* Connecting flange
113 Connecting flange
114 Connecting flange
200 Nozzle cap
201 Carrier

202 Nozzle structure
203 Base structure
204 Connecting flange
205 Fluid channel
206 Electrical contact element
207 Drilled hole
210 Sealing ring
211 Nozzle body
212 Nozzle socket
213 Nozzle channel
214 End channel
215 Nozzle opening
220 Diameter of nozzle opening

The invention claimed is:

1. An atomizer nozzle system, wherein a nozzle cap comprises a plurality of nozzles and, in order to form a nozzle comprises at least one nozzle opening, at least one nozzle channel and at least one nozzle socket, wherein the nozzle cap is arranged on at least one carrier and wherein the at least one carrier comprises a nozzle connector for each nozzle socket of the at least one nozzle socket, wherein the nozzle cap is arranged on the at least one carrier in a releasably fastened manner, and wherein the nozzle cap engages, with an elastic section on the nozzle connector, around a connecting flange and forms a seal on the nozzle connector by elastic deformation.

2. The atomizer nozzle system as claimed in claim 1, wherein the nozzle cap is manufactured at least partially from a flexible material.

3. The atomizer nozzle system as claimed in claim 2, wherein the flexible material comprises a flexible electrical insulator.

4. The atomizer nozzle system as claimed in claim 1, wherein the at least one carrier is manufactured from a rigid material.

5. The atomizer nozzle system as claimed in claim 1, wherein the nozzle cap is secured on the at least one carrier by elastically tensioning latching elements or tensioning a flexible material.

6. The atomizer nozzle system as claimed in claim 1, wherein the nozzle cap comprises a base structure, wherein the base structure is manufactured from a more rigid material in comparison with a nozzle structure, said base structure comprising at least one connecting element for forming a preferably releasable connection with the at least one carrier.

7. The atomizer nozzle system as claimed in claim 6, wherein the base structure comprises a base plate or a base frame on which the nozzle structure is arranged, and the base structure is manufactured from a plastic.

8. The atomizer nozzle system as claimed in claim 1, wherein the nozzle cap comprises at least three nozzle openings, each nozzle opening of the at least three nozzle openings having an assigned nozzle channel, and an assigned nozzle socket, and the at least three nozzle openings are spaced apart from one another to a maximum degree in a nozzle area and arranged following one another along a zig zag line.

9. An atomizer nozzle system, wherein a nozzle cap comprises a plurality of nozzles and, in order to form a nozzle comprises at least one nozzle opening, at least one nozzle channel and at least one nozzle socket, wherein the nozzle cap is arranged on at least one carrier and wherein the at least one carrier comprises a nozzle connector for each nozzle socket of the at least one nozzle socket, wherein the nozzle cap is arranged on the at least one carrier in a releasably fastened manner, and wherein the at least one nozzle opening of the nozzle projects out of a plane of the nozzle cap, wherein an edge of the nozzle which projects out is embodied as a continuously curved curve, and the edge of the nozzle is asymmetrical on an edge side with respect to an opposite edge side of the nozzle, has greater curvature by at least a factor of 1.5.

10. The atomizer nozzle system as claimed in claim 1, wherein the nozzle cap and/or a base plate and/or a carrier plate are embodied in one piece, manufactured using an injection molding method.

11. The atomizer nozzle system as claimed in claim 1, wherein the nozzle cap and a base plate and/or a carrier plate are/is embodied in one piece, manufactured using a multi-component injection molding method or are connected to one another.

12. The atomizer nozzle system as claimed in claim 1, wherein the nozzle connector has a cylindrical connecting flange with a peripheral sealing ring or a sealing bead which is integrally formed onto the cylindrical connecting flange, and the nozzle socket forms a corresponding cylindrical receptacle, in order to provide an interlocking, seal-forming form fit.

13. The atomizer nozzle system as claimed in claim 1, wherein the nozzle connector has a conical connecting flange, and the at least one nozzle socket forms a corresponding conical receptacle, in order to provide an interlocking, seal-forming form fit.

14. The atomizer nozzle system as claimed in claim 1, wherein the at least one nozzle channel is embodied shaped as a conical section or as a conical cap and forms an end channel toward the at least one nozzle opening.

15. The atomizer nozzle system as claimed in claim 14, wherein the end channel comprises a cylindrical or conical tubular section, and the at least one nozzle opening is between 0.1 millimeters (mm) to 0.3 mm, and a length of the nozzle channel is between 4 mm to 6 mm.

16. The atomizer nozzle system as claimed in claim 1, wherein the at least one nozzle opening is between 0.1 millimeters (mm) to 0.3 mm, and a length of the at least one nozzle channel is between 4 mm to 6 mm.

17. The atomizer nozzle system as claimed in claim 1, wherein an electrical contact element, comprising a high-voltage contact, is formed in the nozzle connector, and wherein the electrical contact element projects into a fluid channel, the fluid channel is guided through the electrical contact element, and a distance between the electrical contact element and the at least one nozzle opening is between 5 millimeters (mm) and 20 mm.

18. The atomizer nozzle system as claimed in claim 17, wherein the distance between the electrical contact element and the at least one nozzle opening is between 11 mm and 15 mm.

19. An atomizer nozzle system, wherein a nozzle cap comprises a plurality of nozzles and, in order to form a nozzle comprises at least one nozzle opening, at least one nozzle channel and at least one nozzle socket, wherein the nozzle cap is arranged on at least one carrier and wherein the at least one carrier comprises a nozzle connector for each nozzle socket of the at least one nozzle socket, wherein the nozzle cap is arranged on the at least one carrier in a releasably fastened manner, and wherein an electrical contact element, comprising a high-voltage contact, is formed in the nozzle connector, wherein the electrical contact element projects into a fluid channel.

20. The atomizer nozzle system of claim 19, wherein the fluid channel is guided through the electrical contact element, and a distance between the electrical contact element and the at least one nozzle opening is between 5 millimeters (mm) and 20 mm.

* * * * *